United States Patent
Yanagisawa et al.

(10) Patent No.: US 10,471,514 B2
(45) Date of Patent: *Nov. 12, 2019

(54) METHOD FOR PRODUCING NICKEL POWDER

(71) Applicants: KOCHI UNIVERSITY, NATIONAL UNIVERSITY CORPORATION, Kochi-shi, Kochi (JP); SUMITOMO METAL MINING CO., LTD., Tokyo (JP)

(72) Inventors: Kazumichi Yanagisawa, Kochi (JP); Junhao Zhang, Kochi (JP); Osamu Ikeda, Niihama (JP); Hideki Ohara, Niihama (JP); Tomoaki Yoneyama, Niihama (JP); Yohei Kudo, Niihama (JP); Shin-ichi Heguri, Niihama (JP)

(73) Assignees: KOCHI UNIVERSITY, NATIONAL UNIVERSITY CORPORATION (JP); Sumitomo Metal Mining Co., Ltd. (JP)

( * ) Notice: Subject to any disclaimer, the term of this patent is extended or adjusted under 35 U.S.C. 154(b) by 350 days.

This patent is subject to a terminal disclaimer.

(21) Appl. No.: 15/119,263

(22) PCT Filed: Feb. 9, 2015

(86) PCT No.: PCT/JP2015/053541
§ 371 (c)(1),
(2) Date: Aug. 16, 2016

(87) PCT Pub. No.: WO2015/125650
PCT Pub. Date: Aug. 27, 2015

(65) Prior Publication Data
US 2017/0008090 A1    Jan. 12, 2017

(30) Foreign Application Priority Data

Feb. 21, 2014 (JP) ................ 2014-031253
Mar. 14, 2014 (JP) ................ 2014-051219

(51) Int. Cl.
*B22F 9/26* (2006.01)
*B22F 1/00* (2006.01)
*C22B 3/00* (2006.01)

(52) U.S. Cl.
CPC .............. *B22F 9/26* (2013.01); *B22F 1/0003* (2013.01); *C22B 23/0461* (2013.01); *B22F 2301/15* (2013.01)

(58) Field of Classification Search
CPC ...... B22F 9/26; B22F 1/0003; B22F 2301/15; C22B 23/0461
See application file for complete search history.

(56) References Cited

U.S. PATENT DOCUMENTS 2,853,380 A  *  9/1958  Evans ................. C22B 15/0063
                                                      75/370
3,156,556 A  *  11/1964 Meddings et al. ........ B22F 9/26
                                                      75/370
(Continued)

FOREIGN PATENT DOCUMENTS

JP         49-74160         7/1974
JP         2005-194156      7/2005
(Continued)

OTHER PUBLICATIONS

A. Agrawal, V. Kumar, B.D. Pandey, K.K. Sahu, "A Comprehensive Review On The Hydro Metallurgical Process For The Production Of Nickel And Copper Powders By Hydrogen Reduction", Mat. Rsch. Bull. [41] 879-892 (2006) (Year: 2006).*

(Continued)

*Primary Examiner* — Kevin E Yoon
*Assistant Examiner* — Ryan L Heckman
(74) *Attorney, Agent, or Firm* — Gerald E. Hespos; Michael J. Porco; Matthew T. Hespos

(57) ABSTRACT

Provided is an efficient method for producing nickel powder from a solution containing a nickel ammine complex, the method including adding seed crystals to a solution containing a nickel ammine complex and subjecting the resulting (Continued)

mixture to hydrogen reduction under high temperatures and high pressures to produce nickel powder, which makes it possible to maintain the quality of the nickel powder produced and reduce the amount of the seed crystals used. The method for producing nickel powder is characterized by adding seed crystals and a dispersant having an anionic functional group to the solution containing a nickel ammine complex to form a mixture slurry, and subjecting the mixture slurry to pressurized hydrogen reduction treatment by blowing hydrogen into the mixture slurry in a high temperature and high pressure atmosphere to cause a reduction reaction, thereby reducing the nickel ammine complex in the mixture slurry to obtain nickel powder.

4 Claims, 2 Drawing Sheets

(56) References Cited

U.S. PATENT DOCUMENTS

| | | | |
|---|---|---|---|
| 3,816,098 A | 6/1974 | Mackiw et al. | |
| 4,148,632 A | 4/1979 | Seibt et al. | |
| 4,545,814 A | 10/1985 | Chou et al. | |
| 5,516,748 A * | 5/1996 | Guo | B01F 17/0007 |
| | | | 424/489 |
| 5,584,908 A | 12/1996 | Scheie | |
| 10,118,224 B2 * | 11/2018 | Yanagisawa | B22F 3/10 |
| 2004/0159187 A1 | 8/2004 | Hamalainen et al. | |
| 2010/0280296 A1 * | 11/2010 | Bisson | B01J 23/40 |
| | | | 585/277 |

FOREIGN PATENT DOCUMENTS

| | | |
|---|---|---|
| JP | 2006-283159 | 10/2006 |
| JP | 2010-509213 | 3/2010 |

OTHER PUBLICATIONS

Powder Metallurgy, 1958, No. 1/2, p. 40-52.
International Search Report.

* cited by examiner

METHOD FOR PRODUCING NICKEL POWDER

BACKGROUND

1. Field of the Invention

The present invention relates to a method for producing nickel powder from a solution containing a nickel ammine sulfate complex using fine nickel powder.

2. Description of the Related Art

Example of known methods for producing nickel powder which is expected to be used as a material for conductive paste and positive electrode active material of a nickel-hydrogen battery and the like include a method shown in Japanese Patent Laid-Open No. 2005-194156. The production method disclosed in Japanese Patent Laid-Open No. 2005-194156 is a method for producing nickel hydroxide powder, including: treating, under high temperatures and high pressures, a solution containing a nickel ammine complex produced to cause a reaction represented by the following formula (1) to precipitate nickel hydroxide particles.

[Formula 1]

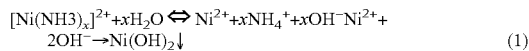

(1)

Nickel powder can be obtained when the nickel hydroxide is reduced with a reducing agent. Although various reducing agents can be used, hydrogen gas is industrially inexpensive and has been widely used.

Further, POWDER METALLURGY, 1958, No. ½, P. 40-52 describes a process for producing nickel powder in Sherritt Gordon Inc.

This production method includes mixing a complexing agent with a nickel sulfate aqueous solution to form a solution containing a nickel ammine complex, putting the solution in a pressurized vessel such as an autoclave, heating the solution to about 150 to 250° C., and blowing hydrogen gas into the solution, in which the nickel ammine complex salt is reduced by hydrogen to obtain nickel powder.

However, the method called a complexing reduction method shown in POWDER METALLURGY, 1958, No. ½, P. 40-52 has a problem that when hydrogen gas is blown, a large amount of fine nickel powder will be nonuniformly produced in many cases if seed crystals serving as nuclei are not present, and as a result, it will be difficult to obtain nickel powder having a predetermined particle size, which makes it difficult to obtain uniform quality.

Further, the method also has a problem that since fine nickel precipitates, like scaling, on the inner wall of the pressurized vessel and on the surface of equipment such as a stirrer, the time and efforts of maintenance of facilities increase, and the rate of recovery of products decreases. Thus, this method is not preferred.

In order to avoid such a state, it is known that such a state can be suppressed by adding seed crystals to the solution and blowing a reducing agent into the resulting mixture. When a reducing agent is blown into the nickel ammine complex solution to thereby start the precipitation of nickel, the addition of the seed crystals advances the growth of nickel using the seed crystals as nuclei and can suppress the occurring of nonuniform precipitation of fine nickel on the surface of vessels and equipment as described above.

In many cases, fine crystals of the same product class are used as seed crystals, or a part of products is processed by crushing or the like and used. On the other hand, it is known that the proportion and the shape of seed crystals added also influence the quality of products.

However, as described above, when a part of products is used, the processing will take time and efforts and may be a factor of cost increase. Further, there has been a problem that quality is not stabilized caused, for example, by the variation in the shape of seed crystals obtained by processing.

Further, a material that has a uniform and fine shape and is easily industrially obtained, for example, iron powder, is also often used as seed crystals.

However, if iron powder, for example, is used as seed crystals as used in the process of POWDER METALLURGY, 1958, No. ½, P. 40-52 in order to obtain nickel powder, the iron powder will influence the quality of products. Therefore, the application of the products will be limited, and such a method is not preferred.

Thus, in order to stabilize the quality of products and reduce production cost, a production method has been desired in which seed crystals of the same type as products are used, and at the same time, the amount of the seed crystals added is suppressed as much as possible.

In such a situation, in order to solve a problem of a reduction in productivity and an increase in cost in a production method including adding nickel seed crystals to a solution containing a nickel ammine complex and subjecting the resulting mixture to hydrogen reduction under high temperatures and high pressures to obtain nickel powder, the present invention provides a production method that reduces the amount of seed crystals used and maintains the quality of nickel powder.

SUMMARY

A first aspect of the present invention to solve the problem described above is a method for producing nickel powder, including: subjecting a mixture slurry formed by adding seed crystals and a dispersant having an anionic functional group to a solution containing a nickel ammine complex to pressurized hydrogen reduction treatment, the treatment including blowing hydrogen into the mixture slurry in a high temperature and high pressure atmosphere of 150° C. to 250° C. to cause a reduction reaction, thereby reducing the nickel ammine complex in the mixture slurry to obtain nickel powder.

The dispersant may be sodium lignosulfonate having an anionic functional group. The amount of the dispersant added in accordance with this aspect of the invention may be in a proportion of 5.0% by weight to 50.0% by weight based on the weight of the seed crystals added to the solution containing a nickel ammine complex.

Alternatively, the dispersant may be sodium dodecylbenzenesulfonate having an anionic functional group. The amount of the dispersant added in accordance with this aspect of the invention may be in a proportion of 0.05% by weight to 10.0% by weight based on the weight of the seed crystals added to the solution containing a nickel ammine complex.

The invention also relates to a method for producing nickel powder, including: subjecting a mixture slurry formed by adding seed crystals and a dispersant having a nonionic functional group to a solution containing a nickel ammine complex to pressurized hydrogen reduction treatment, the treatment including blowing hydrogen into the mixture slurry in a high temperature and high pressure atmosphere of 150° C. to 250° C. to cause a reduction reaction, thereby reducing the nickel ammine complex in the mixture slurry to obtain nickel powder. The amount of the dispersant added may be in a proportion of 5.0% by weight to 50.0% by weight based on the weight of the seed crystals added to the solution containing a nickel ammine complex.

The seed crystals in accordance with any of the above-described aspects of the invention may be nickel powder.

According to the present invention, by adding a dispersant, particularly sodium lignosulfonate, to the solution containing the complex followed by hydrogen reduction in a method for producing nickel powder including adding seed crystals to a solution containing a nickel ammine complex and subjecting the resulting mixture to hydrogen reduction under high temperatures and high pressures, the seed crystals serving as nuclei can be efficiently utilized to produce nickel powder; a reduction in productivity is prevented while reducing the amount of the seed crystals used; an increase in cost related to the production can be suppressed; and the quality of nickel powder can be improved. Thus, an industrially remarkable effect can be achieved.

DETAILED DESCRIPTION

The method for producing high purity nickel powder of the present invention includes adding seed crystals to a solution containing a nickel ammine complex and subjecting the resulting mixture to pressurized hydrogen reduction treatment of performing hydrogen reduction under high temperatures and high pressures using a high pressure vessel such as an autoclave, wherein when the mixture further contains a dispersant having an anionic or nonionic functional group, the rate of reduction can be improved from a previous value of about 20% to about 100%, and nickel particles can be efficiently precipitated.

The present invention will be described using the production flow of the present invention shown in FIG. 1.

Figure 1:
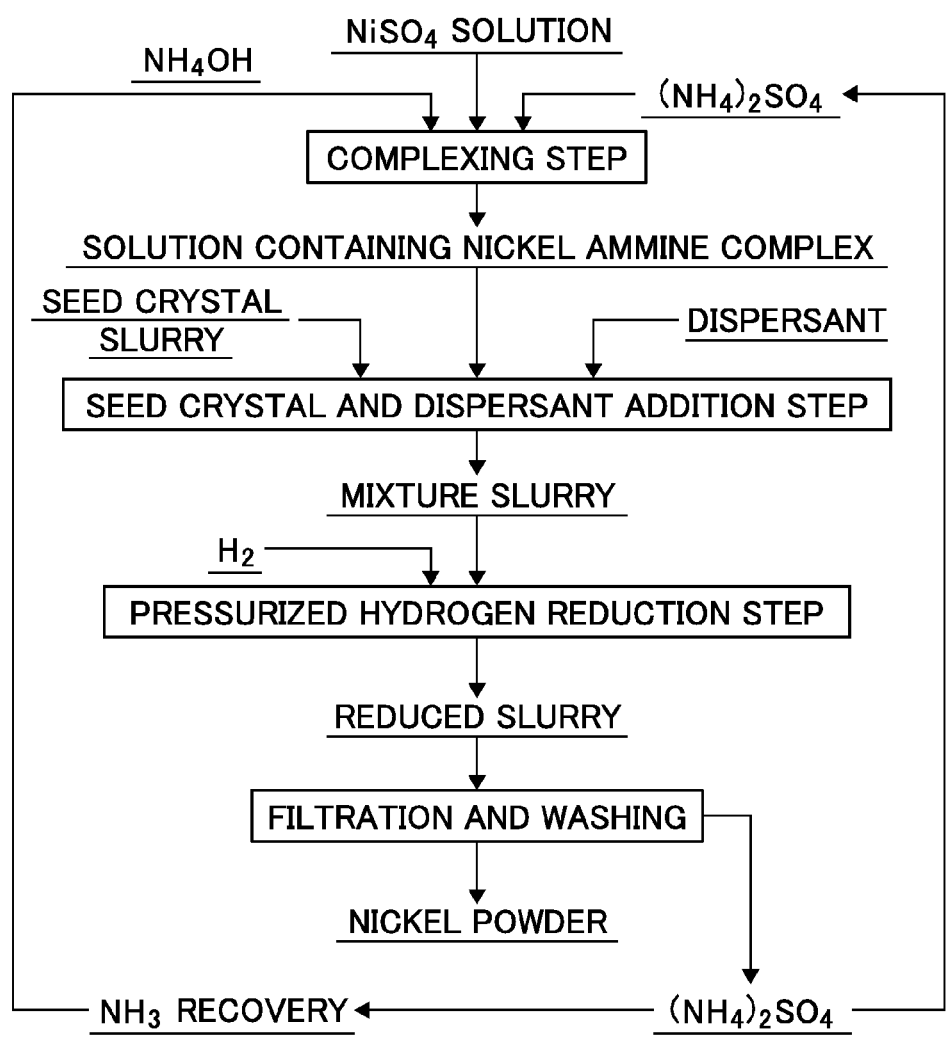
FIG. 1 shows a production flow for producing nickel powder from a solution containing a nickel ammine complex according to the present invention.

The present invention is a production method including: a leaching step of leaching a nickel-containing material with sulfuric acid to produce a nickel sulfate solution (NiSO4) as a leachate; a complexing step of subjecting the nickel sulfate solution (NiSO4) to complexing treatment with aqueous ammonia (NH4OH) and ammonium sulfate ((NH4)2SO4) as shown in FIG. 1 to produce a solution containing a nickel ammine complex; adding seed crystals of nickel powder and a dispersant to the solution containing a nickel ammine complex to form a mixture slurry; a pressurized hydrogen reduction step of subjecting the mixture slurry to hydrogen reduction treatment in a high pressure vessel to obtain a reduced slurry; and subjecting the reduced slurry to a filtration and washing step to form nickel powder.

Further, as the ammonium sulfate and ammonia (NH3) or aqueous ammonia (NH4OH) used for the complexing treatment, ammonium sulfate: (NH4)2SO4 discharged from the filtration and washing step and ammonia or aqueous ammonia recovered from the ammonium sulfate through an ammonia recovery step can be utilized, respectively.

Hereinafter, a dispersant and seed crystals in accordance with aspects of the invention will be described.

[Dispersant]

A dispersant used in the present invention is not limited as long as it has an anionic or nonionic functional group. However, particularly when sodium lignosulfonate or sodium dodecylbenzenesulfonate is used as a dispersant having an anionic functional group, the effect on nickel reduction will be further improved, and a rate of reduction of 80% or more will be obtained.

Here, with respect to the mechanism of improvement in the reduction rate by the addition of the dispersant, seed crystals added are dispersed by the addition of the dispersant, and thus a large amount of nickel can probably be precipitated per one seed crystal to improve the rate of recovery of nickel.

Generally, a molecule of a dispersant is divided into a hydrophobic part and a hydrophilic part, and the hydrophobic part normally adsorbs on the surface of particles to cause dispersion by the repulsion between the charges of the hydrophilic parts. Therefore, the powders on which dispersants have adsorbed repel each other to obtain a dispersing effect.

Further, although PVA (polyvinyl alcohol) and PEG (polyethylene glycol) each having a nonionic functional group can also be used as a dispersant, the effect to the extent obtained from sodium lignosulfonate or sodium dodecylbenzenesulfonate as described above is not obtained, and the amount used also increases. Further, although a cationic dispersant having a positive ion also exists, it is not suitable because it is, for example, industrially expensive and increases cost.

Further, with respect to the amount of a dispersant added, sodium lignosulfonate is preferably added in an amount of 5.0% to 50.0% by weight, and sodium dodecylbenzenesulfonate is preferably added in an amount of 0.05% to 10.0% by weight, based on the weight of seed crystals added to a solution containing a nickel ammine complex.

The amount of such a dispersant added is influenced by the type of the dispersant, but is significantly dependent on and influenced by the particle size or the specific surface area of seed crystals. When seed crystals having the same weight are added, seed crystals having a smaller particle size will have a larger specific surface area, and conversely, seed crystals having a larger particle size will have a smaller specific surface area, which reduces the amount of the dispersant added. When the nickel powder as products is repeatedly used as seed crystals, the particle size of the seed crystals may show variations. Therefore, the specific surface area of the seed crystals may also be large or small.

Therefore, even when the particles of seed crystals are the smallest, the amount of a dispersant required for coating all the particles is 0.05% to 50.0% by weight. Particularly, sodium dodecylbenzenesulfonate as a dispersant is desirably added in an amount in a range of 0.05% by weight or more and 10.0% by weight or less, and sodium lignosulfonate as a dispersant is desirably added in an amount in a range of 5.0% by weight or more and 50.0% by weight or less. If a dispersant is added in an amount smaller than the above ranges, the effect of improvement in the rate of reduction will decrease, and if a dispersant is added in an amount greater than the above ranges, a further increase in the effect cannot be expected, and the cost of chemicals will be wasted as the amount of the chemicals is increased.

Further, when a dispersant is excessively added, the above specific effect found by the present invention will not develop, but a problem of causing aggregation will arise.

Figure 2:
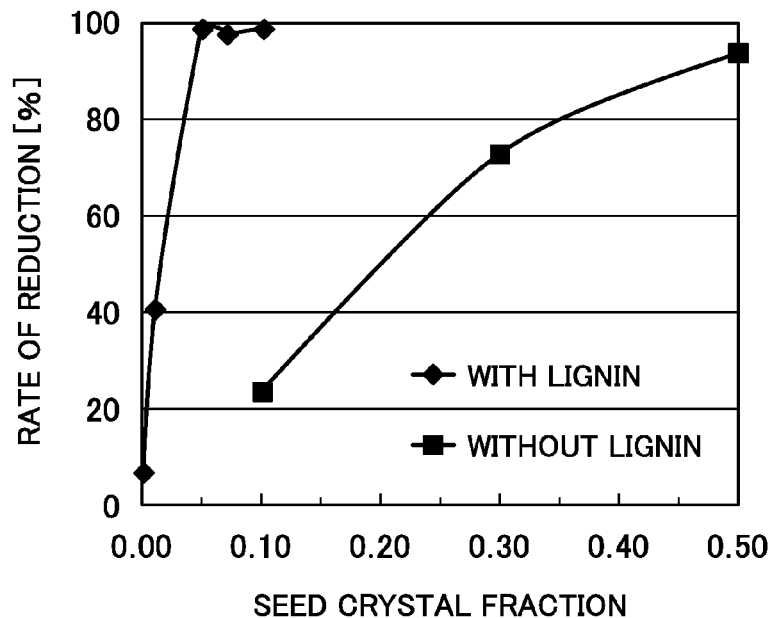
FIG. 2 shows changes of a reduction rate with a seed ratio when a dispersant of the present invention is added or not.

Note that, as shown in FIG. 2, although the rate of reduction when a dispersant is not used is about 25%, it is improved to 95% or more by adding the dispersant of the present invention.

[Seed Crystals]

When fine nickel powder is used as seed crystals, the purity of nickel powder to be formed is not reduced, and high purity nickel powder can be obtained.

Further, when the particle size of the fine nickel seed crystal used is in the range of 0.5 to 5.0 μm, an effect will be achieved without impairing the uniformity of nickel powder formed, the action of accelerating the dispersion of nickel powder formed when the above dispersant is used, and the like. The particle size outside the above range may impair the uniformity and dispersion and is not desirable.

The amount of nickel circulating through the system as seed crystals can be reduced by the present invention. Accordingly, the proportion of nickel powder which forms products is improved, and the productivity is improved. Further, since the amount of nickel powder repeatedly used is reduced, the facility size for obtaining the same production volume can be suitably reduced, and the cost can also be reduced.

EXAMPLES

The present invention will be further described below using Examples.

FIG. 1 is a production step flow chart showing an example of the method for producing nickel powder according to the present invention, and is a production step flow chart in the case of using "a solution containing a nickel ammine complex" prepared through a complexing step using "a nickel sulfate (NiSO4) solution" as a nickel original solution.

The rate of reduction used in the following Examples has been determined by measuring the Ni concentration in a solution after hydrogen reduction.

Rate of reduction [%]=100−amount of Ni remaining in solution/amount of charged Ni×100  [Expression 1]

Example 1

A batch type autoclave having a capacity of 3 L was used as a production apparatus.

A solution containing 336 g of reagent grade nickel sulfate hexahydrate and 330 g of ammonium sulfate in 440 ml of pure water was prepared; thereto was added 191 ml of 25% aqueous ammonia; the total volume of the resulting solution was adjusted to 1000 ml, which was used as a starting solution; and an inner cylinder of the above autoclave was charged with the starting solution.

To the starting solution charged in the inner cylinder, were added 7.5 g of commercially available nickel powder as seed crystals and 0.4 g of sodium lignosulfonate as a dispersant to form a mixture slurry, and the autoclave was charged with the inner cylinder and sealed.

The additive rate of the seed crystals at this time became 10% by weight (7.5/75×100=10).

Next, a pressurized hydrogen reduction step was performed under the following conditions.

The autoclave was heated to an internal temperature of 185° C. by a heat medium heater with stirring at 750 rpm using an electric stirrer. From the time point when the temperature reached 185° C., hydrogen gas was blown from a gas cylinder into a liquid phase part in the inner cylinder at a flow rate of 2.0 liters/min, and the internal pressure was increased to 3.5 MPa, which was maintained to cause a reduction reaction.

The reaction was performed for 60 minutes after hydrogen gas was started to be blown; the feed of hydrogen gas was stopped after a lapse of 60 minutes; and the inner cylinder was then cooled to room temperature with stirring.

The cooled inner cylinder was removed from the autoclave, and the reduced slurry in the inner cylinder was subjected to solid-liquid separation by filtration using filter paper and a nutsche in a filtration and washing step to recover nickel powder. The recovered nickel powder was washed with water to wash away impurities.

The rate of reduction of nickel was about 99%.

The pH of the filtrate after reduction was in a range of 6.5 to 7.5.

Comparative Example 1

Comparative Example 1 was performed under the same conditions as in Example 1 except that a dispersant was not added. To a solution containing 440 ml of pure water, 336 g of nickel sulfate hexahydrate, and 330 g of ammonium sulfate, was added 191 ml of 25% aqueous ammonia, and the resulting solution was adjusted to a total volume of 1000 ml and charged into the inner cylinder. To the solution in the inner cylinder, was added 7.5 g of nickel powder as seed crystals which was the same one as used in Example 1.

Next, the above inner cylinder was set to the autoclave, which was heated to an internal temperature of 185° C. by a heat medium heater with stirring at 750 rpm using a stirrer in the same manner as in Example 1. From the time point when the temperature reached 185° C., hydrogen gas was blown into a liquid phase part in the inner cylinder at 2.0 liters/min, and the internal pressure was increased to 3.5 MPa, which was maintained to promote a reduction reaction.

The reaction was performed for 60 minutes after hydrogen gas was started to be blown; the feed of hydrogen gas was then stopped; and the inner cylinder was cooled.

The cooled inner cylinder was removed, and the slurry in the removed inner cylinder was subjected to solid-liquid separation to recover nickel powder.

The recovered nickel powder had a weight of about 25 g and a reduction rate of 24%.

Example 2

In Example 2, nickel powder was produced in the same manner as in Example 1 except that the proportion of the seed crystals added was set to the seed ratio of 0.05 (that is, 5%), and the rate of reduction of the nickel powder was determined.

Example 3

Nickel powder was produced in the same manner as in Example 1 except that the proportion of the seed crystals added was set to the seed ratio of 0.07 (that is, 7%), and the rate of reduction of the nickel powder was determined.

Comparative Example 2

Nickel powder was produced in the same manner as in Example 1 except that the proportion of the seed crystals added was set to the seed ratio of 0.01 (that is, 1%), and the rate of reduction of the nickel powder was determined.

Comparative Example 3

In Comparative Example 3, nickel powder was produced in the same manner as in Example 1 except that only the dispersant was added without adding the seed crystals, and the rate of reduction of the nickel powder was determined.

Comparative Example 4

Nickel powder was produced in the same manner as in Example 1 except that only the seed crystals were added in the seed ratio of 0.30 (that is, 30%) without adding the dispersant, and the rate of reduction of the nickel powder was determined.

Comparative Example 5

Nickel powder was produced in the same manner as in Example 1 except that only the seed crystals were added in the seed ratio of 0.50 (that is, 50%) without adding the dispersant, and the rate of reduction of the nickel powder was determined.

The results of Examples 1 to 3 and Comparative Examples 1 to 5 are collectively shown in Table 1, and the changes of the rate of reduction with the seed ratio when a dispersant is added or not is shown in FIG. 2.

As shown in Table 1 and FIG. 2, the rate of reduction was 7% in the case of Comparative Example 3 in which only the dispersant was added without adding the seed crystals. On the other hand, the rate of reduction was improved to 99% by setting the seed ratio to 0.05 in Example 2.

That is, it is found that a dispersant has a remarkable effect on the improvement of the rate of reduction when seed crystals are added.

Further, an almost equal rate of reduction was obtained also when the seed ratio was set to 0.07 (Example 3) and 0.10 (Example 1), and it is found that the effect is obtained when the seed ratio is set to about 0.05 (5%).

On the other hand, also when only the seed ratio was increased without using the dispersant as described in Comparative Examples 1, 4, and 5, the rate of reduction was improved, but the amount of the seed crystals required is in a fraction of about 0.5 which is 10 times the fraction in the case where the above dispersant was used. Accordingly, it is found that the cost is increased so much. In other words, the amount of the seed crystals required is reduced by the present invention to about 1/10 as compared with that in the case where the dispersant is not used. Thus, it is found that the cost can be reduced so much by the reduction in the amount of products to be repeatedly used and the amount of products to be purchased, and the dispersant has the effect of significantly reducing the influence even when impurities derived from the seed crystals are present.

TABLE 1

| | Dispersant | | | |
|---|---|---|---|---|
| | Type | Additive amount [g] | Seed ratio | Rate of reduction [%] |
| Example 1 | Sodium lignosulfonate | 0.4 | 0.10 | 99 |
| Example 2 | | | 0.05 | 99 |
| Example 3 | | | 0.07 | 98 |
| Comparative Example 1 | — | — | 0.10 | 24 |
| Comparative Example 2 | Sodium lignosulfonate | 0.4 | 0.01 | 41 |
| Comparative Example 3 | Sodium lignosulfonate | 0.4 | — | 7 |
| Comparative Example 4 | — | — | 0.30 | 73 |
| Comparative Example 5 | | | 0.50 | 94 |

Example 4

To a solution containing 336 g of nickel sulfate hexahydrate and 330 g of ammonium sulfate, was added 191 ml of 25% aqueous ammonia, and the resulting solution was adjusted to a total volume of 1000 ml followed by complexing treatment to prepare a solution containing a nickel ammine complex.

To the solution, were added a seed crystal slurry containing 15 g of nickel powder as seed crystals (the additive rate of the seed crystals is 20% by weight) and sodium dodecylbenzenesulfonate as a dispersant in an amount of 1.3% by weight based on the weight of the seed crystals to prepare a mixture slurry.

Next, the pressurized hydrogen reduction step was performed under the following conditions. The prepared mixture slurry was charged into an autoclave as a high pressure vessel, heated to 185° C. with stirring, and then subjected to reduction treatment by blowing hydrogen gas as a reducing agent into the mixture slurry and feeding the hydrogen gas to a pressure in the autoclave of 3.5 MPa.

After a lapse of one hour from the start of the feeding of hydrogen gas, the feed of the hydrogen gas was stopped, and the autoclave was cooled. The reduced slurry obtained after the cooling was filtered to recover nickel powder.

Figure 3:
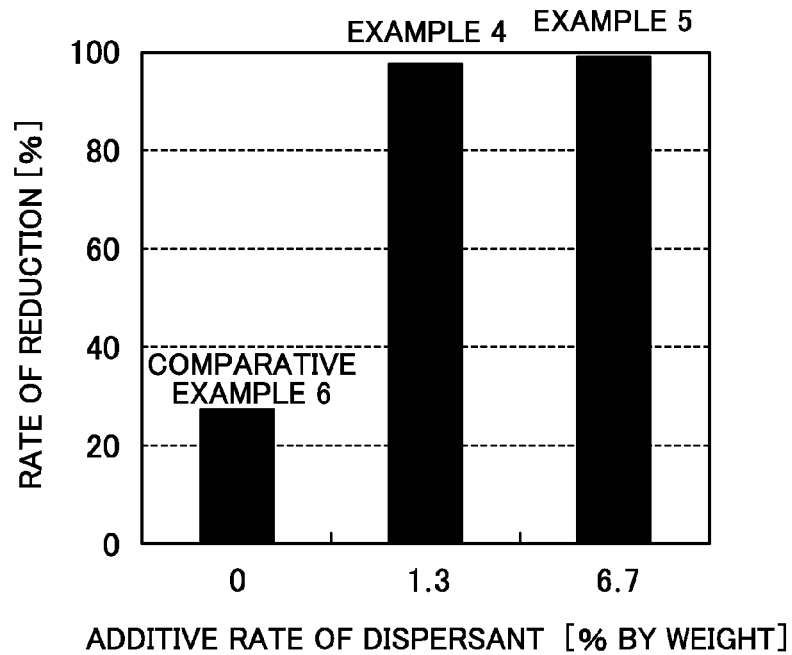
FIG. 3 shows reduction rates in Examples of the present invention.

The rate of nickel reduction obtained at this time was 95% or more as shown in FIG. 3.

Example 5

Nickel powder was prepared and recovered under the same conditions as in Example 4 except that the amount of sodium dodecylbenzenesulfonate added as a dispersant was set to 6.7% by weight based on the weight of the seed crystals.

The rate of nickel reduction of the recovered nickel powder according to Example 5 obtained was 95% or more as shown in FIG. 3.

Comparative Example 6

To a solution containing 336 g of nickel sulfate hexahydrate and 330 g of ammonium sulfate, was added 191 ml of 25% aqueous ammonia, and the resulting solution was adjusted to a total volume of 1000 ml followed by complexing treatment to prepare a solution containing a nickel ammine complex. To the solution, was added a seed crystal slurry containing 15 g of nickel powder as seed crystals to prepare a mixture slurry.

The mixture slurry was charged into an autoclave and heated to 185° C. with stirring, and hydrogen gas was then blown into the mixture slurry and fed to a pressure in the autoclave of 3.5 MPa.

After a lapse of one hour from the start of the feeding of hydrogen gas, the feed of the hydrogen gas was stopped. Subsequently, a reduced slurry obtained by cooling the autoclave was filtered to recover nickel powder.

The rate of nickel reduction of the recovered nickel powder according to Comparative Example 6 was about 25% as shown in FIG. 3.

The invention claimed is:

1. A method for producing nickel powder, comprising: adding seed crystals and sodium lignosulfonate as a dispersant having an anionic functional group to a solution containing a nickel ammine complex so that an amount of the dispersant added is in a proportion of 5.0% to 50.0% by weight based on a weight of the seed crystals added to the solution containing a nickel ammine complex to form a mixture slurry, the seed crystals being added at 5% to 10% by weight relative to a nickel amount contained in the solution containing the nickel ammine complex; and subjecting the mixture slurry to pressurized hydrogen reduction treatment by blowing hydrogen into the mixture slurry in a high temperature and high pressure atmosphere of 150° C. to 250° C. to cause a reduction reaction, thereby reducing the nickel ammine complex in the mixture slurry to obtain nickel powder.

2. A method for producing nickel powder comprising: adding seed crystals and dodecylbenzenesulfonate having an anionic functional group as a dispersant to a solution containing a nickel ammine complex so that an amount of the dispersant added is in a proportion of 0.05% to 10.0% by weight based on a weight of the seed crystals added to the solution containing a nickel ammine complex to form a mixture slurry, the seed crystals being added at 20% by weight relative to a nickel amount contained in the solution containing the nickel ammine complex; and subjecting the mixture slurry to pressurized hydrogen reduction treatment by blowing hydrogen into the mixture slurry in a high temperature and high pressure atmosphere of 150° C. to 250° C. to cause a reduction reaction, thereby reducing the nickel ammine complex in the mixture slurry to obtain nickel powder.

3. The method for producing nickel powder according to claim 2, wherein the seed crystals are nickel powder.

4. The method for producing nickel powder according to claim 1, wherein the seed crystals are nickel powder.

\* \* \* \* \*